United States Patent
Kulaha

(10) Patent No.: US 11,525,658 B2
(45) Date of Patent: Dec. 13, 2022

(54) COMBINED DEPTH GAUGE

(71) Applicant: Valeriy Kulaha, Poltava (UA)

(72) Inventor: Valeriy Kulaha, Poltava (UA)

( * ) Notice: Subject to any disclaimer, the term of this patent is extended or adjusted under 35 U.S.C. 154(b) by 117 days.

(21) Appl. No.: 17/005,355

(22) Filed: Aug. 28, 2020

(65) Prior Publication Data

US 2022/0065606 A1 Mar. 3, 2022

(51) Int. Cl.
*G01B 3/14* (2006.01)
*G01B 3/28* (2006.01)
*G01F 23/16* (2006.01)

(52) U.S. Cl.
CPC .............. *G01B 3/28* (2013.01); *G01B 3/14* (2013.01); *G01F 23/16* (2013.01)

(58) Field of Classification Search
None
See application file for complete search history.

(56) References Cited

U.S. PATENT DOCUMENTS

| | | | | |
|---|---|---|---|---|
| 1,848,952 A | * | 3/1932 | Hurley | G01K 13/02 374/142 |
| 1,917,272 A | * | 7/1933 | Podbielniak | G01N 25/14 202/160 |
| 2,559,436 A | * | 7/1951 | Isserstedt | G01F 23/167 73/302 |
| 3,528,290 A | * | 9/1970 | Lecocq | G01L 19/16 73/291 |
| 3,677,087 A | * | 7/1972 | Alinari | G01C 13/008 73/300 |
| 3,717,032 A | * | 2/1973 | Alinari | G01F 23/16 73/300 |
| 4,059,995 A | * | 11/1977 | De Palacio | G01F 23/16 73/301 |
| 4,098,110 A | * | 7/1978 | Bowden | G01C 13/008 73/300 |
| 7,189,360 B1 | * | 3/2007 | Ho | G01N 27/126 29/592.1 |
| 2011/0113877 A1 | * | 5/2011 | Rebeaud | G01C 13/008 73/302 |
| 2014/0260559 A1 | * | 9/2014 | Hofmann | B01L 3/502746 73/54.02 |
| 2015/0285724 A1 | * | 10/2015 | Cohen | B01F 5/0647 73/53.01 |
| 2015/0328635 A1 | * | 11/2015 | Reiter | B81C 1/00119 422/503 |
| 2015/0377853 A1 | * | 12/2015 | Feng | G01N 1/28 73/863 |

FOREIGN PATENT DOCUMENTS

| | | | | |
|---|---|---|---|---|
| CN | 103512561 A | * | 1/2014 | ........... G01C 13/008 |
| EP | 0145379 A2 | * | 6/1985 | ............. G01F 23/14 |
| RU | 79274 U1 | * | 12/2008 | |

* cited by examiner

*Primary Examiner* — Christopher W Fulton

(57) ABSTRACT

Combining several capillary tubes in one depth gauge, which measure the depth in different ranges, will allow obtaining a measuring scale close to linear and eliminate the main disadvantage of a capillary depth gauge.

1 Claim, 2 Drawing Sheets

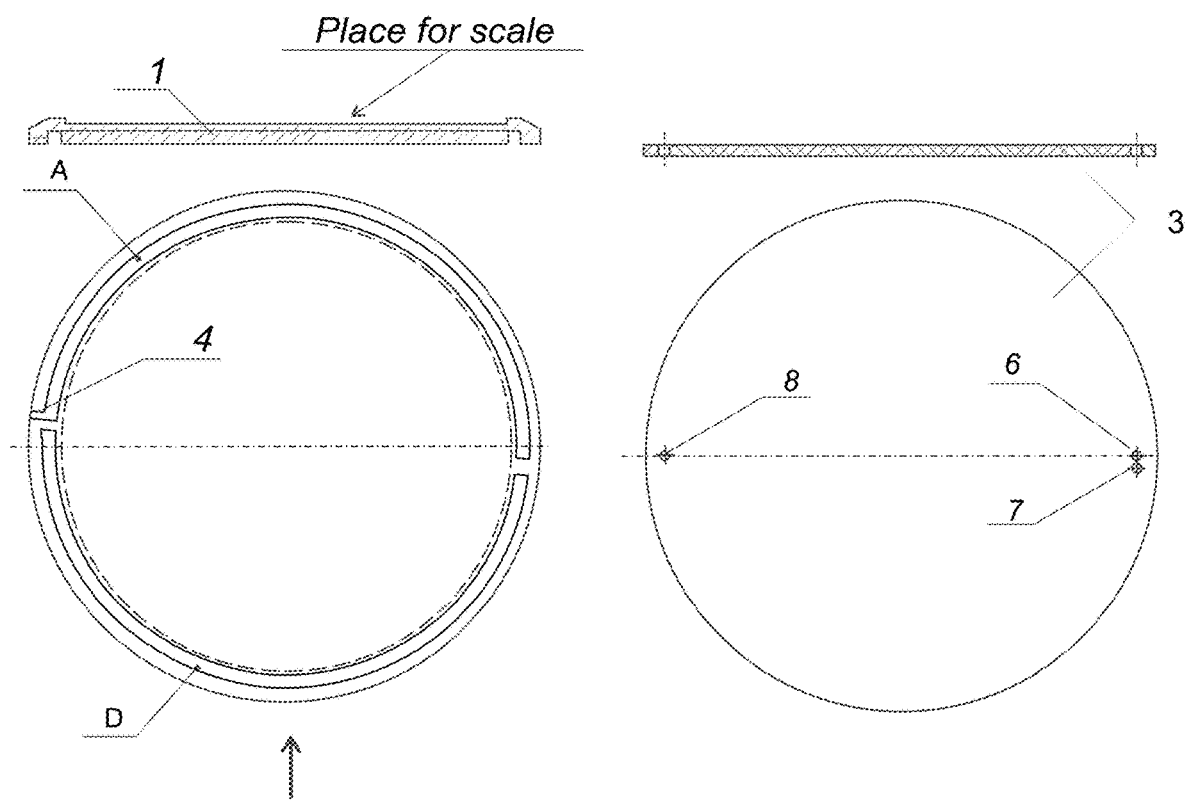
FIG.5
FIG.6
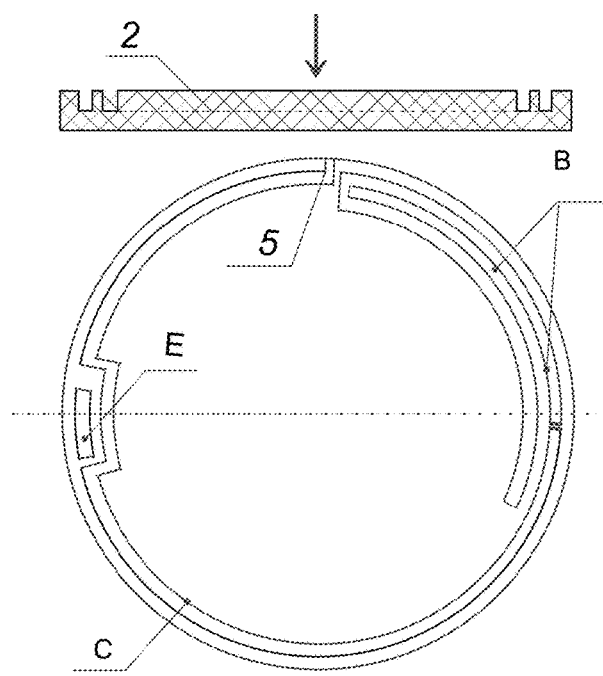
FIG.7

COMBINED DEPTH GAUGE

REFERENCES CITED

U.S. Pat. No. 3,677,087 7/1972 Alinari 73/300
U.S. Pat. No. 3,188,864 6/1965 Dean 73/300
U.S. Pat. No. 3,538,290 9/1970 Lecocq 73/300

BACKGROUND OF THE INVENTION

Depth gauges are devices that are widely used in some types of use, such as for example for diving. Several types of devices exist. Among these, capillary depth gauges are well known.

Capillary Depth Gauge (also known as a bubble depth gauge) is the simplest instrument designed for diving to measure the depth in which you find yourself. It consists of a tube that is stoppered on one end and attached to a scale plate. This depth gauge is very accurate in shallow waters, but its accuracy reduces in deeper waters due to significant nonlinearity of the scale.

Figure 1:
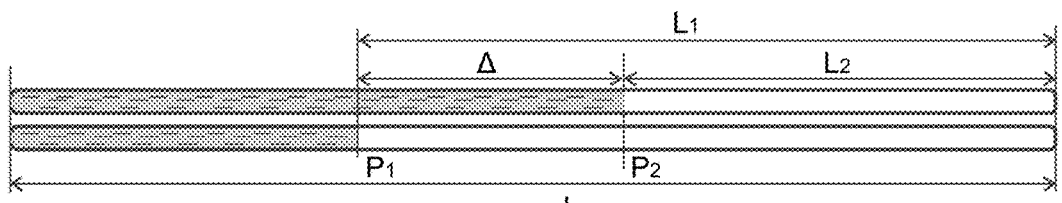

Although commonly known as capillary depth gauges, maximum depth gauges do not function by capillarity. The compression of the air space within the tube follows the general gas law:

$$P1*V1/T1 = P2*V2/T2 \qquad (1)$$

where P, V, and T represent pressure (in atmospheres), volume (cm3) and temperature (° K), respectively. The effects of temperature differentials are considered later in this paper and can be omitted at this stage. Since the diameter of the device remains constant, the equation can be modified to determine changes in the length (L) of the air column in the tube, as follows:

$$Ps*Ls = P1*L1 = P2*L2 \qquad (2)$$

where Ps is the pressure at the water surface (1 Atm), Ls is the original length of the air column at the surface, P1 and L1 are the pressure and length of air column at depth D1, P2 and L2—at depth D2 respectively. (FIG. 1).

A Technical Solution is Known

The gauge employs a transparent lens member having an annular magnifying lens portion located above an arcuate capillary groove in a surface which is held under compression against an opaque gasket. A face plate carrying peripheral graduations is mounted to the lens member interiorly of the annular lens portion in concentric relationship with said groove.

All known depth gauges consist of one capillary tube, the length of which is limited by the size of a wristwatch-like device.

Figure 2:
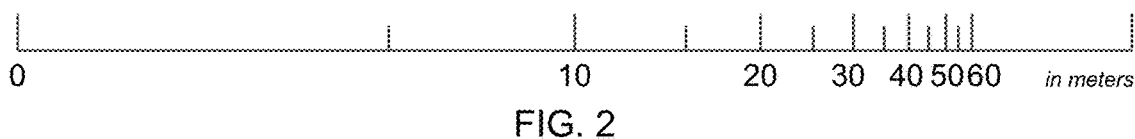

The scale of the depth gauge is as shown in FIG. 2. The range from 0 to 30 meters is 75% of the scale, while the range from 30 to 60 meters is only 10.7%.

SUMMARY OF THE INVENTION

Figure 3:
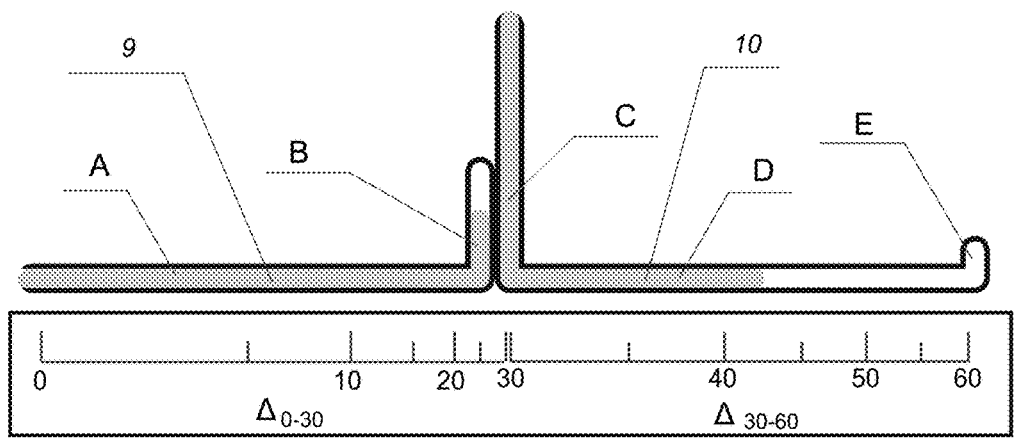

The proposed device is made in the form of several capillary tubes, which are combined in one housing. Each capillary tube is designed to measure a given depth range, with the first tube having two chambers—measuring and absorbing, and all subsequent tubes have three chambers—one measuring and two absorbing. (FIG. 3)

In this example, two capillary depth gauges are combined in one housing. The first depth gauge has a capillary length of 120 mm, and a scale length from 0 to 30 meters is 90 mm. The second depth gauge has a capillary length of 840 mm, which makes it possible to obtain a scale length from 30 to 60 meters equal to 90 mm. Thus, we obtained a device in which the depth ranges of 0-30 m. and 30-60 m. each occupy 50% of the device scale and allow us to confidently obtain depth readings with an accuracy of one meter.

The use of a larger number of capillary tubes in device will allow obtaining a measuring scale close to linear.

GENERAL DESCRIPTION OF THE DRAWING

FIG. 1—Prior Art Illustration for Boyle's Law and Capillary Depth Gauge

FIG. 2—Prior Art Scale of capillary depth gauges.

FIG. 3—Scheme of combined device with two capillary tubes.

Figure 4:
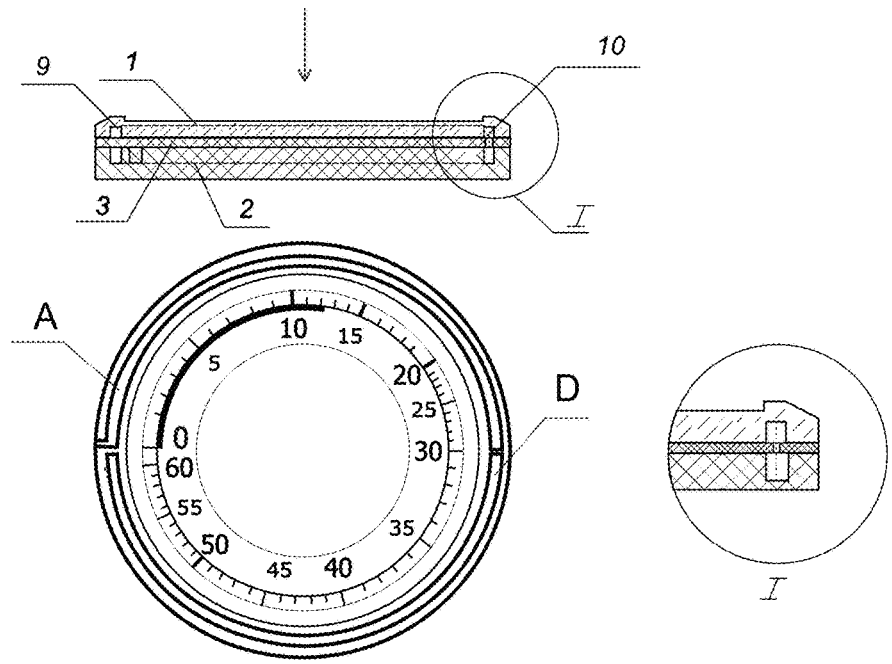

FIG. 4—Combined depth gauge with two tubes. Main View.

FIG. 5—The housing 1 of measuring chambers A and D.

FIG. 6—The flat plate 3 with holes 6,7,8.

FIG. 7—The housing 2 with absorbing chambers B, C and E.

DESCRIPTION OF THE INVENTION

The device for measuring the depth of immersion (FIG. 4) consists of a housing of measuring chambers 1 made of transparent plastic in the form of a round washer with measuring chambers A and D (FIG. 5), a flat plate 3 with holes 6,7,8 (FIG. 6) and the housing 2 with absorbing chambers B, C and E. (FIG. 7).

Chamber A through the hole 4 and chamber C through the hole 5 are connected to the external environment.

The housings 1 and 2, tightly connected together, with a plate 3 located between them, form the volumes of two gauge's tubes—9 with chambers A and B, and 10—with chambers C, D and E. All chambers are connected to each other by holes 6,7, 8 in the plate 3. On the surface of the measuring housing 1, a scale is applied to read the readings of the device in channels A and D.

A scale with divisions and inscriptions is applied or glued into the recess on the surface of the transparent case 1

Housings 1,2 and plate 3 can be made of plastic by injection molding, which allows for mass production of parts.

When the device is immersed in water, through the hole 4 it begins to fill the measuring chamber A of the pressure tube 9 and through the hole 5 in the housing 2 the filling absorbing chamber C of the pressure tube 10. Depth readings are read from the meniscus in measuring chamber A. After immersion to a depth of more than 30 meters, water from chamber A of the pressure gauge 9 through the hole 6 in the plate 3 goes into the absorbing chamber B and through the hole 7 begins to flow into the measuring chamber D of the second pressure gauge 10 and the position of the meniscus in this chamber allows you to fix the depth of immersion from 30 to 60 meters. The position of the water in the pressure gauges 9 and 10 at a depth of 45 meters is shown in the diagram of FIG. 3. After reaching a depth of more than 60 meters, water from the measuring chamber D through the hole 8 begins to fill the absorbing chamber E.

I claim:

1. A device for measuring depth, comprising a housing with a scale and a measuring element located in the housing along its circumference, characterized in that in order to increase the accuracy of measuring the depth of immersion, the measuring element is made in the form of several capillary channels (tubes) connected at one end to external environment and stoppered on other end, each of which is designed to measure a given range of depths, while the first channel (tube) has two chambers, measuring and absorbing, and all subsequent channels have three chambers, two absorbing and one measuring and the length (volume) of each of the capillary channels (tubes) is calculated based on the required length of the measuring chambers of these channels (tubes).

* * * * *